United States Patent
Kim et al.

(10) Patent No.: US 9,872,176 B2
(45) Date of Patent: Jan. 16, 2018

(54) METHOD FOR PROCESSING AUTHENTICATION, ELECTRONIC DEVICE AND SERVER FOR SUPPORTING THE SAME

(71) Applicant: Samsung Electronics Co., Ltd., Gyeonggi-do (KR)

(72) Inventors: Junghun Kim, Gyeonggi-do (KR); Jaehwan Kim, Gyeonggi-do (KR); Sangmi Park, Gyeonggi-do (KR); Yongseok Park, Gyeonggi-do (KR); Jisup Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 192 days.

(21) Appl. No.: 14/853,323

(22) Filed: Sep. 14, 2015

(65) Prior Publication Data

US 2016/0080938 A1    Mar. 17, 2016

(30) Foreign Application Priority Data

Sep. 12, 2014   (KR) ......................... 10-2014-0121149

(51) Int. Cl.
*H04L 29/06*   (2006.01)
*H04W 12/06*   (2009.01)
*H04W 12/08*   (2009.01)

(52) U.S. Cl.
CPC ........... *H04W 12/06* (2013.01); *H04W 12/08* (2013.01)

(58) Field of Classification Search
CPC .. H04W 12/06; H04W 12/08; H04L 61/6054; H04L 12/2898
USPC ............................................................ 726/7
See application file for complete search history.

(56) References Cited

U.S. PATENT DOCUMENTS

2012/0142314 A1* 6/2012 Mohammed ........ H04L 63/0428
                                                              455/411
2013/0204888 A1   8/2013 Guzman Suarez et al.

FOREIGN PATENT DOCUMENTS

GB            2504968 A  *  2/2014  ............ H04W 4/001

* cited by examiner

*Primary Examiner* — Syed Zaidi
*Assistant Examiner* — S. Ali Zaidi
(74) *Attorney, Agent, or Firm* — The Farrell Law Firm, P.C.

(57) ABSTRACT

Disclosed is an electronic device including a processor that receives an input signal for requesting an authentication, determines whether a mobile oriented (MO) server is available based on at least one of an international mobile subscriber identity (IMSI) or network Internet Protocol (IP) information of the electronic device, and if it is determined that the MO server is available, creates an authentication code, and a communication module that transmits the created authentication code to the MO server.

18 Claims, 9 Drawing Sheets

METHOD FOR PROCESSING AUTHENTICATION, ELECTRONIC DEVICE AND SERVER FOR SUPPORTING THE SAME

PRIORITY

This application claims priority under 35 U.S.C. §119(a) to Korean Patent Application No. 10-2014-0121149, filed in the Korean Intellectual Property Office on Sep. 12, 2014, the contents of which are incorporated herein by reference.

BACKGROUND OF THE INVENTION

1. Field of the Invention

The present invention relates generally to a method for processing authentication, and an electronic device and a server for providing the same, and more particularly to technology for processing authentication through data communication with an authentication server in the background environment of an electronic device.

2. Description of the Related Art

As technology has rapidly advanced, a portable electronic device that can perform a variety of functions has become a necessity for users. Along with providing conventional voice call service, the portable electronic device has developed into a multimedia communication device providing various data transmission services and various value-added services.

When the electronic device uses a specific value-added service, an authentication server related to the value-added service requires the electronic device to be authenticated in order to strengthen the security of the value-added service, prevent unauthorized access, and effectively support the service. In addition, in order to use a telephone number-based service, the user of the electronic device is required to process the user authentication in association with a server that provides the service.

The authentication server requests a telephone number or an authentication number from the electronic device for the authentication of the electronic device. In order to conduct the authentication process, the user of the electronic device makes a request to the authentication server for the authentication number, in response to which the authentication server sends the authentication number to the electronic device. The received authentication number is transmitted to the authentication server by inputting the authentication number into the electronic device, to complete the authentication for using the corresponding value-added service.

The user of the electronic device has to wait to receive an authentication code from the authentication-requested server for a predetermined time, before the user can input the received authentication code into the electronic device. This delay is an inconvenience to the user, who must wait an indefinite period of time in order to possibly receive the authentication code.

When the electronic device receives the authentication code from an external server, a variety of time differences may occur depending on the regions, countries, or communication service providers involved. These variables diminish a user's reliability on the authentication code, and the inconsistency of this process causes uncertainty about the authentication system to the user.

SUMMARY OF THE INVENTION

The present invention has been made to address the above-mentioned problems and disadvantages, and to provide at least the advantages described below.

Accordingly, an aspect of the present invention is to provide a method, an electronic device and a server for processing the authentication.

According to an aspect of embodiments of the present invention, an electronic device includes a processor configured to receive an input signal for requesting an authentication, determine whether a mobile oriented (MO) server is available based on at least one of an international mobile subscriber identity (IMSI) and network Internet protocol information of the electronic device, and if it is determined that the MO server is available, create an authentication code, and a communication module configured to transmit the created authentication code to the MO server.

According to another aspect of embodiments of the present invention, a method for processing an authentication in an electronic device includes receiving, by a processor, an input signal for requesting the authentication, determining, by the processor, whether an MO server is available based on at least one of an IMSI and network Internet protocol information of the electronic device, if it is determined that the MO server is available, creating, by the processor, an authentication code, and controlling, by the processor, a communication module to transmit the created authentication code to the MO server.

According to another aspect of embodiments of the present invention, a host device includes an authentication management module that receives a signal for requesting telephone number information corresponding to an MO server from an electronic device, transmits the telephone number information corresponding to the MO server to the electronic device, stores the information of the electronic device when an authentication code and the telephone number information of the electronic device are received, and transmits an authentication token to the electronic device.

According to another aspect of embodiments of the present invention, an electronic device includes a processor that receives an input signal for requesting an authentication, and determines a server that communicates with the electronic device based on at least one of an international mobile subscriber identity or network Internet protocol information of the electronic device, and a communication module that communicates with the determined server.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Figure 1:
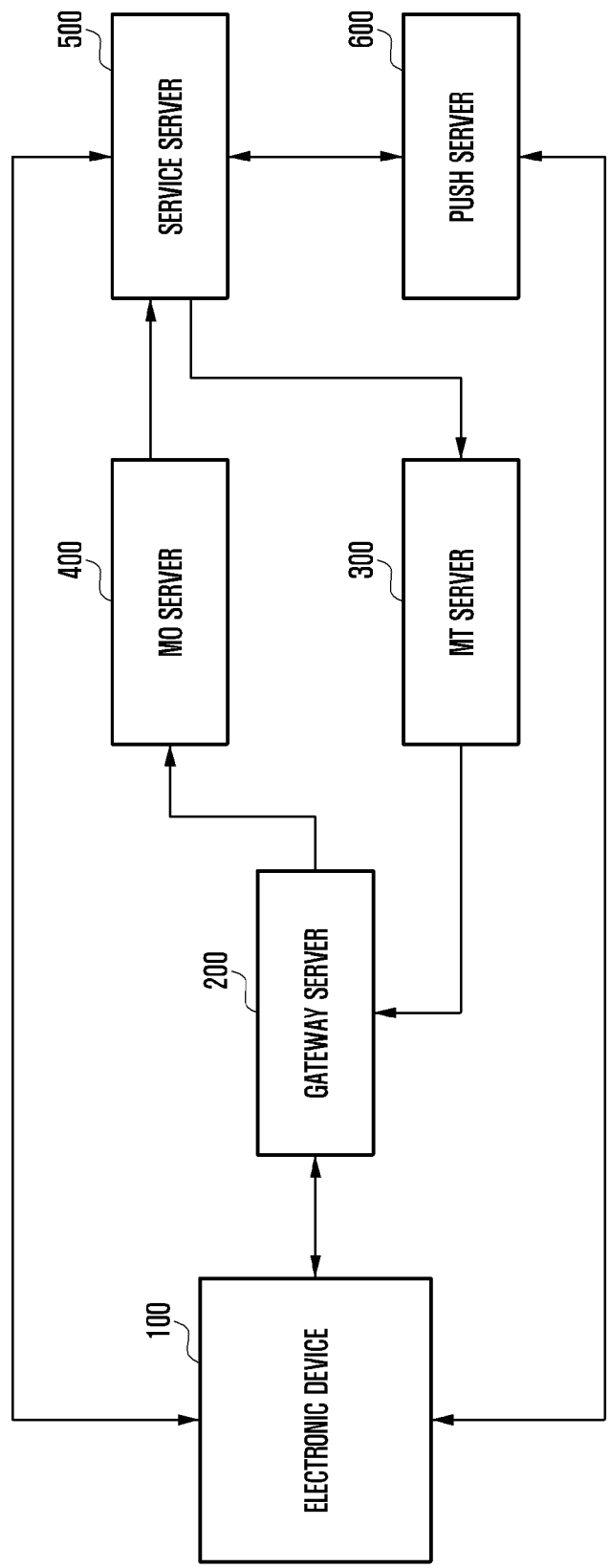
FIG. 1 illustrates an authentication process between an electronic device and servers, according to various embodiments of the present invention.

Embodiments of the present invention will be described in detail with reference to the accompanying drawings. It should be noted that the same elements will be designated by the same reference numerals although they are shown in different drawings. Further, a detailed description of known functions and configurations which may make the subject matter of the present invention unclear will be omitted, for the sake of clarity and conciseness.

The electronic device, according to various embodiments of the present invention, receives a signal for requesting an authentication signal to thereby automatically use the authentication service through a background environment, for user convenience and to reduce the authentication cost.

FIG. 1 illustrates an authentication process between an electronic device 100 and servers 200, 300, 400, 500, and 600, according to various embodiments of the present invention.

The electronic device 100 is capable of performing a communication function. For example, the electronic device includes at least one of a smart phone, a tablet personal computer (PC), a mobile phone, a video phone, an e-book reader, a desktop PC, a laptop PC, a netbook computer, a personal digital assistant (PDA), a portable multimedia player (PMP), a MP3 player, a mobile medical device, a camera, and a wearable device including a head-mounted-device (HMD) such as electronic glasses, electronic clothes, an electronic bracelet, an electronic necklace, an electronic accessory, an electronic tattoo, or a smart watch.

The electronic device 100 can include a subscriber identity module (SIM) card mounted on one side of the electronic device 100. The SIM card may be an integrated chip (IC) card implemented by the SIM.

According to an embodiment of the present invention, the electronic device can determine a server that performs an authentication process in order to use services provided by a service server 500. For example, the electronic device 100 can determine which one of a mobile terminated (MT) server 300, a mobile oriented (MO) server 400, an automated calling system (ACS) server, or a server providing another function is to be used in order to use the service provided by the service server 500.

According to an embodiment of the present invention, the electronic device 100 can determine whether the MT server 300 or the MO server 400 is to be used, in order to use the service provided by the service server 500. When the electronic device 100 transmits a signal for requesting information on the availability of the MO server 400 to the service server 500, the service server 500 can transmit information related to the MO server 400 to the electronic device 100. The information related to the MO server 400 includes, for example, a trend in the use of the MO server 400 for each country, or a trend of regional location of the MO server 400.

If the electronic device 100 determines to use the MT server 300, the electronic device 100 receives data using a short message service (SMS) from the MT server 300 through the gateway server 200. In another embodiment, the electronic device 100 receives data using an SMS through the MT server 300.

When using the MO server 400, the electronic device 100 can transmit, to the MO server 400, a signal for requesting telephone number information corresponding to the MO server 400, such as the address of the MO server 400. The electronic device 100 can receive the telephone number information corresponding to the MO server 400 from the MO server 400, and can transmit an authentication code to the MO server 400 through the gateway server 200 based on the identified telephone number information corresponding to the MO server 400.

The electronic device 100 can transmit data such as the authentication code or the telephone number information of the electronic device 100, using an SMS to the MO server 400 through the gateway server 200.

The electronic device 100 can transmit a signal to the service server 500 in order to determine whether the authentication code is stored. The electronic device 100 can receive, from the service server 500, an authentication token, which includes the authority to perform the service provided by the service server 500. The electronic device 100 can store the received authentication token.

According to an embodiment of the present invention, the electronic device 100 can receive a push authentication token from a push server 600, store the received authentication token, and receive separate information, data, or a user interface including push notification from the push server 600, after receiving the push authentication token from the push server 600.

According to an embodiment of the present invention, the gateway server 200 can connect the network between the electronic device 100 and the MT server 300 or the MO server 400. According to an embodiment, the gateway server 200 may be a data transmission/reception channel server between the electronic device 100 and the MT server 300 or the MO server 400 using an SMS. For example, when the electronic device 100 detects a request input for transmitting data using an SMS to the MO server 400, the gateway server 200 transfers the data received from the electronic device 100 to the MO server 400. The gateway server 200 may be configured separately or integrated into the MT server 300 or the MO server 400.

The MT server 300 can transfer data to the electronic device 100, using an SMS. For example, the MT server 300 may be a server or a web, which can transmit messages to a general terminal such as the electronic device 100, using an SMS. The MT server 300 may use an SMS, a long message service, or a multimedia message service in order to send data to the electronic device 100. For example, the MT server 300 can transmit data such as message data, image data, and video data, to the electronic device 100 through the gateway server 200.

The electronic device 100 can receive a signal for requesting the authentication in order to use the service provided by the service server 500. For example, the electronic device 100 detects a touch input event with respect to a check graphic user interface such as a thumbnail image or a shortcut icon, in order to use the service.

When the electronic device 100 receives the authentication request signal, the electronic device 100 transmits a signal for requesting the data for processing the authentication to the service server 500. The service server 500 can transmit the request signal for the authentication processing of the electronic device 100 to the MT server 300. For example, the MT server 300 can receive, from the service server 500, a request signal for transmitting the authentication code to the electronic device 100. The MT server 300 transmits the authentication code to the electronic device 100. The authentication code may be an encryption code that is issued to the electronic device 100 in order to use the service provided by the service server 500. For example, the authentication code may be created according to the time when the electronic device 100 requests the authentication, network IP information, or the type of electronic device 100.

In another embodiment, the MT server 300 can transmit data to the electronic device 100.

According to an embodiment of the present invention, the MO server 400 may be a server that is the destination of the data transmitted using an SMS in the electronic device 100. For example, the user of the electronic device 100 transmits a message to the terminal corresponding to a specific number through a mobile communication provider server. The mobile communication provider server may forward the message received from the electronic device 100 to a terminal or a server, which corresponds to a specified number determined by the electronic device 100. The specific number may be a telephone number corresponding to the MO server 400. For another example, the electronic device 100 identifies the number corresponding to the MO server 400, and transmits data to the MO server 400 using the identified number.

In an embodiment, the MO server 400 can receive a signal for requesting telephone number information corresponding to the MO server 400 from the electronic device 100. The MO server 400 can transmit the telephone number information corresponding to the MO server 400 to the electronic device 100 in response to the telephone number information request signal received from the electronic device 100.

The MO server 400, according to an embodiment of the present invention, can receive the authentication code through the gateway server 200. The MO server 400 can transmit the received authentication code and the telephone number information of the electronic device 100 to the service server 500. In another embodiment, the MO server 400 can receive the authentication code from the electronic device 100.

The service server 500, according to an embodiment of the present invention, may be a server that: processes the authentication the electronic device 100; stores and manages the user information of the electronic device 100; and provides services. According to an embodiment, the service server 500 may be a server that provides a specific service such as an application service or a web service. When a signal for requesting a specific service is received from the electronic device 100, the service server 500, in response thereto, transmits application data capable of providing the specific service to the electronic device 100.

According to an embodiment, the service server 500 can transmit information on the availability of the MO server 400 to the electronic device 100. For example, when the electronic device 100 can transmit a signal for requesting the information on the availability of the MO server 400 to the service server 500, the service server 500 transmits the information related to the MO server 400 to the electronic device 100.

The service server 500, according to an embodiment of the present invention, receives the authentication code and the telephone number information of the electronic device 100 from the MO server 400. The service server 500, according to an embodiment of the present invention, receives a "check signal" request to determine whether the authentication code is stored in the service server 500, from the electronic device 100, after receiving the authentication code and the telephone number information of the electronic device 100. If the authentication code of the electronic device 100 is stored in the service server 500, the service server 500 stores the information of the electronic device 100 such as a mobile equipment identity (MEI), an international mobile subscriber identity (IMSI), a media access control (MAC) address, and model information of the electronic device 100. The service server 500 can register the information related to the electronic device 100 in the database in order for the electronic device 100, which has received the authentication token, to use the service provided by the service server 500.

The service server 500 can receive a signal for requesting the authentication from the electronic device 100 and transmit, to the MT server 300, a request signal for transmitting the authentication code to the electronic device 100.

If the authentication code of the electronic device 100 is stored in the service server 500, the service server 500 transmits the authentication token, which includes the authority to access the service provided by the service server 500, to the electronic device 100. The authentication token includes ID information of the electronic device 100.

The service server 500 can manage the data related to the electronic device 100 that is registered for the electronic device 100 to use the service. If the data communication is not made with the electronic device 100 that has been registered for the electronic device 100 to use the service within a predetermined critical time such as 24 or 48 hours, the service server 500 temporarily pauses the service for the electronic device 100.

The service server 500 can transmit a "check signal" request to the electronic device 100, which has been registered for the electronic device 100 to use the service, in order to determine whether the electronic device 100 is to use the service provided by the service server 500. If the data communication is not made with the electronic device 100 or a response to the "check signal" request is not received from the electronic device 100 within a predetermined critical period of time such as one or two years, the service server 500 deletes the user data of the electronic device 100. The "check signal" request includes information related to the deleting of the user's service registration with respect to the electronic device 100. The service server 500 may not delete the data that is unrelated to the personal information of the electronic device 100.

In an embodiment of the present invention, the service server 500 transmits/receives the data related to the authentication or the service to/from the push server 600.

The push server 600 can transmit a signal of a push notification to the electronic device 100. According to an embodiment of the present invention, the push server 600 transmits a push authentication token including the authority to receive the push notification to the electronic device 100.

According to another embodiment, the push server 600 may be omitted when performing the authentication system, or may be integrated into the service server 500.

Figure 2A:
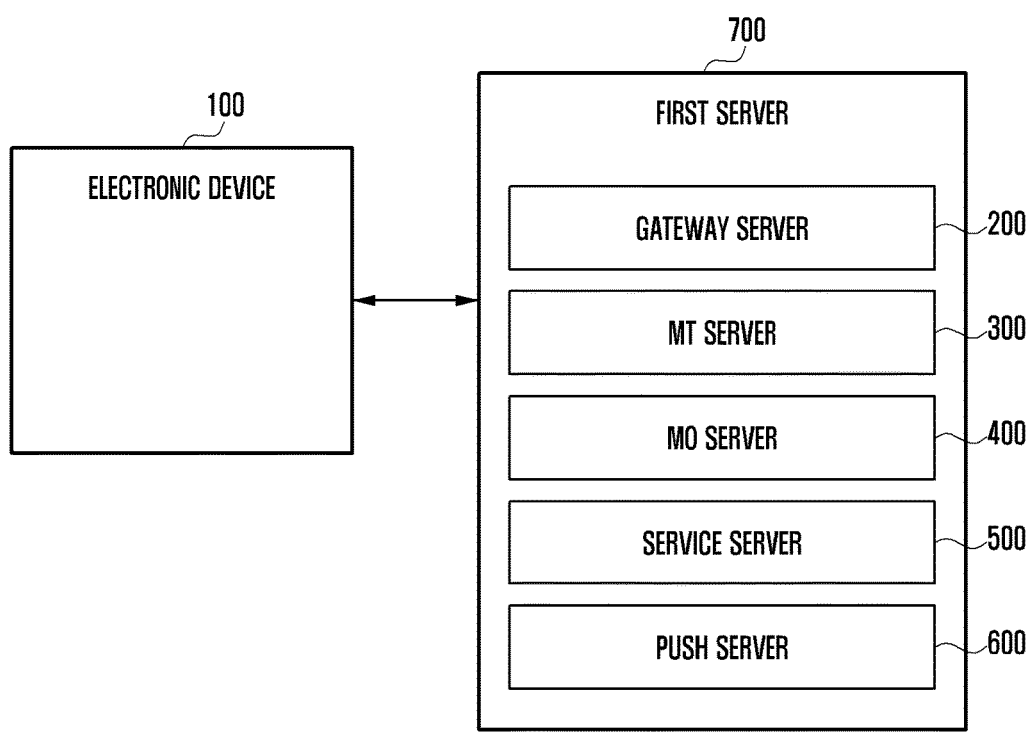
FIGS. 2A, 2B and 2C illustrate an authentication process between an electronic device and servers, according to various embodiments of the present invention.
Figure 2B:
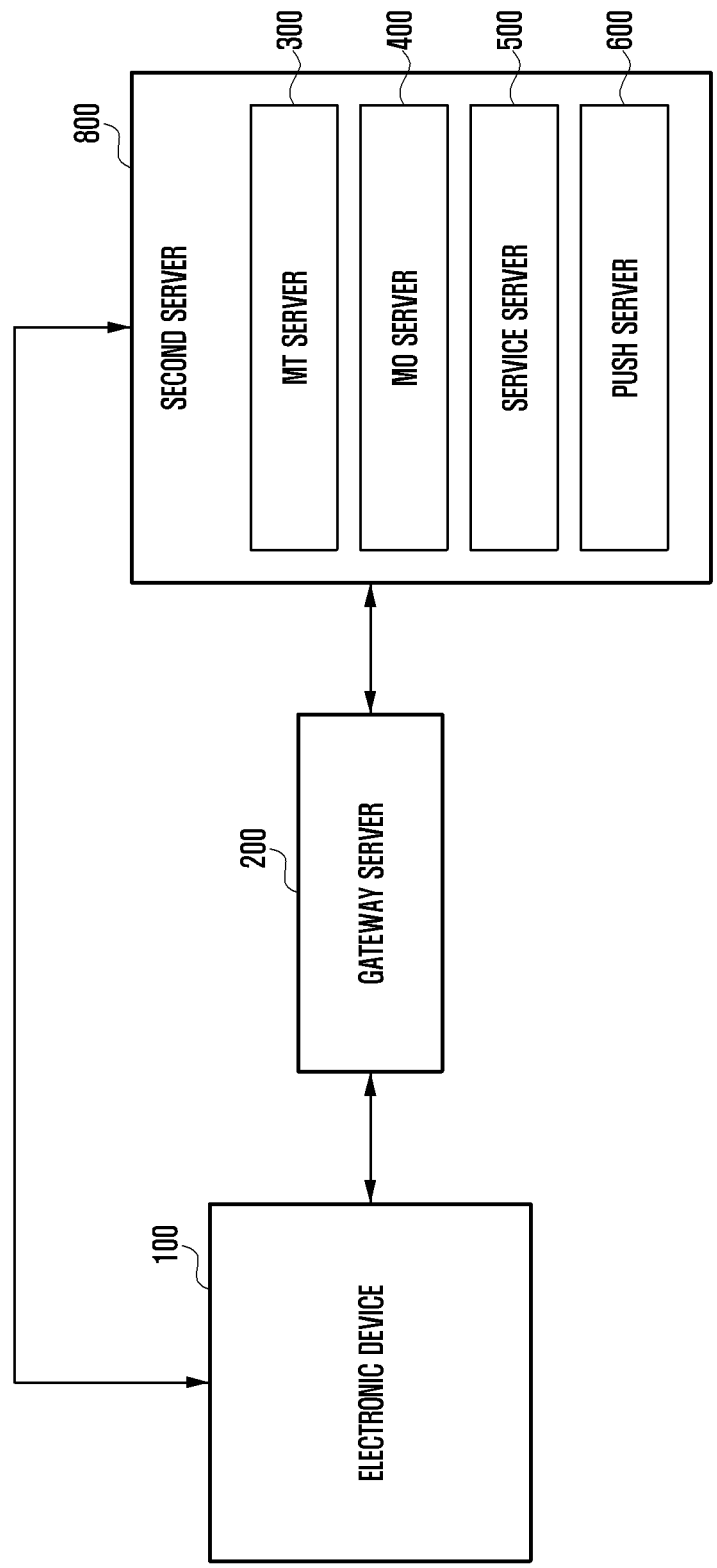
Figure 2C:
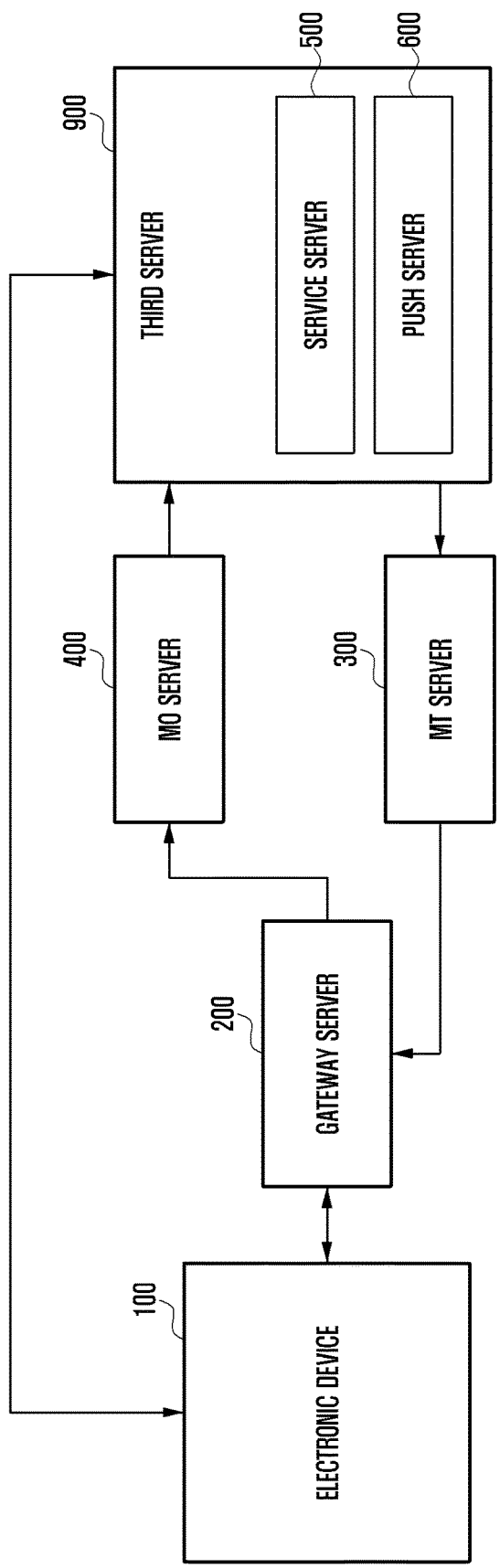

FIGS. 2A, 2B and 2C illustrate an authentication process between an electronic device 100 and servers 200, 300, 400, 500, and 600, according to various embodiments of the present invention.

Referring to FIGS. 2A, 2B and 2C, the servers 200, 300, 400, 500, and 600 can be implemented as a single server or a multi-server depending on the service provided.

Referring to FIG. 2A, the electronic device 100 processes the authentication through the data communication with the first server 700, which includes the gateway server 200, the MT server 300, the MO server 400, the service server 500, and the push server 600. The first server 700 may be a single server that performs functions provided by the gateway server 200, the MT server 300, the MO server 400, the service server 500 and the push server 600.

Referring to FIG. 2B, the electronic device 100 processes the authentication through the gateway server 200 and the second server 800, which includes the MT server 300, the MO server 400, the service server 500, and the push server 600. The second server 800 may be a single server that performs functions provided by the MT server 300, the MO server 400, the service server 500, and the push server 600.

Referring to FIG. 2C, the electronic device 100 processes the authentication though the gateway server 200, the MT server 300, the MO server 400, and the third server 900, which includes the service server 500 and the push server 600. The third server 900 may be a single server that performs functions provided by the service server 500 and the push server 600.

Figure 3:
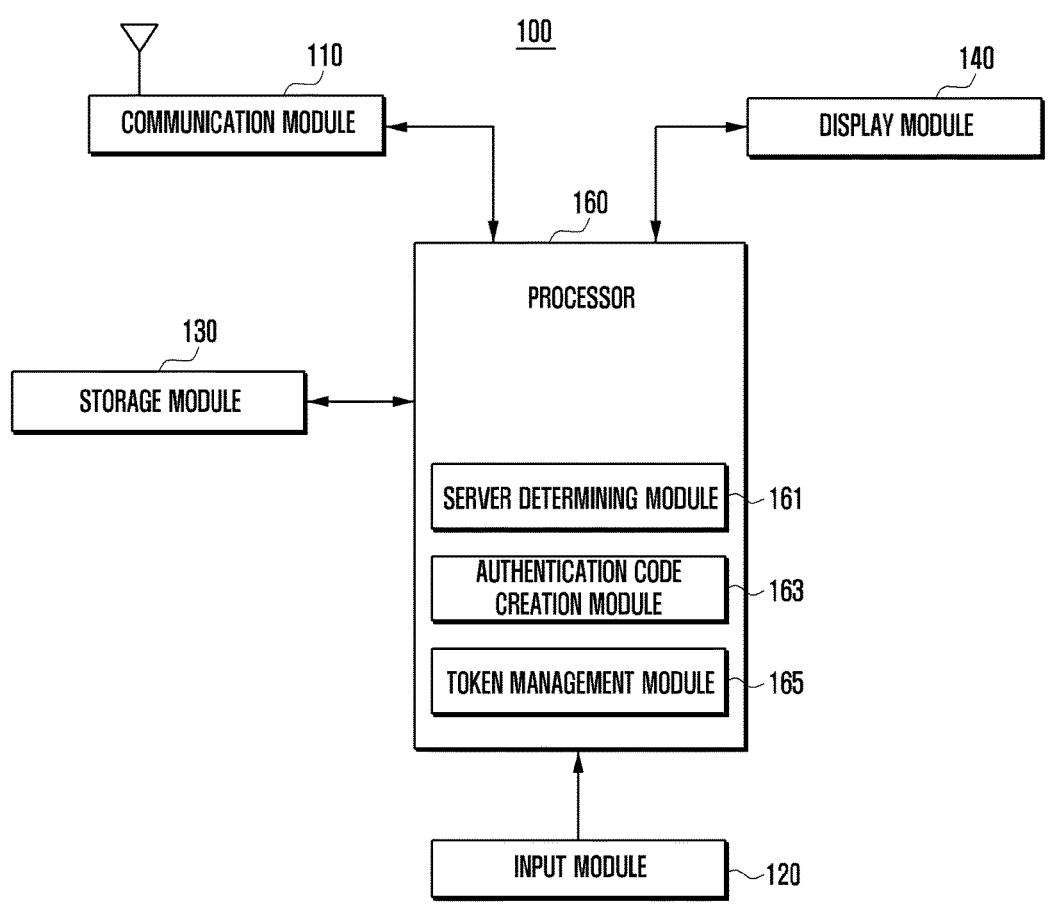
FIG. 3 is a block diagram of the configuration of an electronic device, according to various embodiments of the present invention.

FIG. 3 is a block diagram of the configuration of an electronic device 100, according to various embodiments of the present invention. The electronic device 100 includes a communication module 110, an input module 120, a storage module 130, a display module 140, and a processor 160.

The communication module 110 supports mobile communication services of the electronic device 100 and forms a communication channel with a mobile communication system. To this end, the communication module 110 includes a radio frequency transmitter that up-converts and amplifies the frequency of the transmitted signal, and a receiver that low-noise-amplifies and down-converts a frequency of the received signal.

The input module 120 includes a plurality of input keys for receiving an input of number information or text information, and function keys for configuring a variety of functions. The function keys include direction keys, side keys, and shortcut keys, which are configured to conduct specific functions. In addition, the input module 120 creates key signals related to the user configuration and the function control of the electronic device 100, and sends the key signals to the processor 160.

The storage module 130 includes application programs necessary for the operation of functions, application programs for reproducing various files stored, and a key or menu map for the operation of the display module 140. The key map and the menu map may be provided in various forms.

That is, the key map may be a keyboard map, a 3*4 key map, a qwerty key map, or may be a control key map for controlling the operation of the running application programs. In addition, the menu map may be a control key map for controlling the operation of the running application programs, or may be a menu map that includes various menu items provided by the electronic device 100. The storage module 130 includes a program area and a data area.

The program area includes an operating system for booting the electronic device 100 and operating the elements set forth above, and application programs for reproducing a variety of files, such as an application program for supporting a call function according to the supporting of the functions of the electronic device 100, a web browser for connecting to an Internet server, an MP3 application program for reproducing various sound sources, an image output application program for displaying photos, or a movie playing application program.

The data area stores the data created according to the use of the electronic device 100, and stores telephone book information, at least one icon according to a widget function, and various pieces of content. In addition, when the data area is provided in the display module 140, the data area stores a user input received through the display module 140.

According to an embodiment of the present invention, the storage module 130 stores the information on the availability of the MT server 300 or the MO server 400 depending on the country. According to an embodiment, the storage module 130 stores the authentication token, or the push authentication token, which are received from the external server.

The display module 140 can display information received from the user or information to be provided to the user as well as various menus of the electronic device 100. That is, display module 140 provides various images, such as a standby image, a menu image, a message writing image, or a call image, according to the use of the electronic device 100. The display module 140 may be implemented by a liquid crystal display (LCD), or an organic light emitting diode (OLED), and may be included in the input device. In addition, the electronic device 100 provides various menu images that can be carried out based on the display module 140 according to the support of the display module 140.

The display module 140 may be provided in the form of a touch screen by being combined with a touch panel. For example, the touch screen may be configured as an integrated module in the laminated structure of the display panel and the touch panel. For example, the touch panel detects a touch input in at least one of a capacitive type, a pressure-sensitive type, an infrared type, or an ultrasonic type. The touch panel may further include a controller. In the case of the capacitive type, the touch panel detects the proximity as well as the touch input. The touch panel further includes a tactile layer, with which the touch panel provides a user with a tactile reaction. According to an embodiment, the display module 140 detects a touch input event for requesting the execution of the functions of the portable terminal 100, and transfers the information corresponding to the detected touch input event to the processor 160.

According to an embodiment of the present invention, the display module 140 receives an input signal such as a touch input event for requesting the authentication.

The processor 160 supports an initialization process by controlling the supply of power to each element of the electronic device 100. When the initialization process is completed, the processor 160 controls each element.

According to an embodiment of the present invention, the processor 160 includes a server determining module 161, an authentication code creation module 163, and a token management module 165.

According to an embodiment of the present invention, the processor 160 can receive an input signal for requesting the authentication. The authentication request input signal may be the user input event for performing a separate program, or the user input signal, such as an agreement on the terms of a service. For example, the authentication may be provided to enable to electronic device 100 to use the service provided by the service server 500.

According to an embodiment of the present invention, when the input signal for requesting the authentication is received, the processor 160 controls to process the authentication with respect to the subsequent process through the background environment of the electronic device 100. The background environment indicates an environment that is automatically processed by a predetermined process rather than an output environment created by a user's manual input.

According to an embodiment of the present invention, the server determining module 161 can determine a server that is to conduct the authentication process in order to use the service provided by the service server 500. For example, the server determination module 161 determines which one of the MT server 300, the MO server 400, the ACS server, or a server that provides another function is to be used in order to use the service provided by the service server 500. The server that provides another function may be a server that can perform an additional authentication method, and may be added or changed by the user.

According to an embodiment, the server determination module 161 determines the server based on a cache table that includes information on the availability of the server, and status information of the electronic device 100. The cache table includes information on the availability of the MT server 300, the MO server 400, the ACS server, or a server that provides another function for each country. The status information of the electronic device 100 includes information related to location information of the electronic device 100, and transmission/reception state information with respect to the server.

According to an embodiment of the present invention, the server determining module 161 determines the availability of the MO server based on at least one of an IMSI or a network IP of the electronic device.

The IMSI denotes an identification (ID) by which a mobile communication subscriber can be globally identified, and may be comprised of a public land mobile network (PLMN) ID and a mobile subscription identification number (MSIN). The PLMN ID includes a mobile country code (MCC), and a mobile network code (MNC) by which the communication provider can be identified. For example, the MCC may be a 3-digit number, and the MNC may be a 2-digit number. The MSIN, which is for identifying the subscriber in the communication provider, may have up to 10 digits.

The network IP information includes one or more unique addresses to distinguish the electronic device 100 from other electronic devices using the Internet.

According to an embodiment of the present invention, the server determining module 161 determines the availability of the MO server 400 based on the data related to the MO server 400, which is stored in the storage module 130, or the data related to the MO server 400, which is received from the external server.

According to an embodiment, the server determining module 161 identifies the country code included in the IMSI, and determines whether the MO server 400 is used in the country corresponding to the identified code. For example, the server determining module 161 pre-stores the information on the countries that do not use the MO server 400 pursuant to the national legislation or policy in the storage module 130. The server determining module 161 determines the availability of the MO server 400 based on the data related to the MO server 400, which is stored in the storage module 130.

According to an embodiment, the processor 160 can update the MO server-related data stored in the storage module 130 by conducting data communication with the service server 500 through the communication module 110. For example, the storage module 130 receives the MO server-using information of countries, regions, and communication providers from the service server 500 and store the information.

According to an embodiment, if the server determining module 161 determines that all of the MO server 400, the MT server 300 or the ACS are available for use by the electronic device 100, the server determining module 161 preferentially selects the MO server 400. For example, if the server determining module 161, based on the MO server-related data stored in the storage module 130, determines that the MO server 400 and the MT server 300 are available for use, the server determining module 161 determines that the MO server 400 can be preferentially used based on predetermined conditions.

According to an embodiment, the server determination module 161 determines the location of the local service server 500, based on the network IP information. For example, when transmitting/receiving data to/from the service server 500 at the location of unit 16, Yeongtong Avenue 112, Yeongtong-gu, Suwon-si, Gyeonggi-do, using the network IP information, the server determining module 161 determines the position of the closest service server 500 to the location of unit 16, Yeongtong Avenue 112, Yeongtong-gu, Suwon-si, Gyeonggi-do.

According to an embodiment of the present invention, the authentication code creation module 163 creates the authentication code when the MO server 400 is determined to be available.

According to an embodiment of the present invention, the authentication code creation module 163 creates the authentication code through the communication module 110 based on at least one of the IMSI and an IMEI (International Mobile Equipment Identity) of the electronic device, or the creation start time of the authentication code. The IMEI is a unique identification number that is assigned to the electronic device 100 by a mobile phone manufacturer. The creation start time of the authentication code is when the authentication code creation module 163 starts to create the authentication code, or the time within a critical time such as 0.1 or 0.01 seconds from when the creation of the authentication code starts.

According to an embodiment of the present invention, the authentication code creation module 163 creates the authentication code in the form of a hash code through a predetermined encryption method. The predetermined encryption method may be secure hash algorithm (SHA)-1, or SHA-2 such as SHA-224, SHA-256, SHA-384, or SHA 512.

According to an embodiment of the present invention, the processor 160 controls to transmit the created authentication code to the MO server 400 through the communication module 110.

According to an embodiment of the present invention, the processor 160 identifies the telephone number information corresponding to the MO server 400, and controls to transmit the created authentication code to the MO server 400 through the communication module 110 by using an SMS. The processor 160 controls to transmit the authentication code to the MO server 400 using a multimedia messaging service (MMS) or a long message service (LMS).

According to an embodiment, the historical data related to the SMS, which is stored in the storage module 130, is deleted after the transmission to the MO server 400, and the information transmitted to MO server 400 is transferred to the service server 500 together with call information of the electronic device 100.

According to an embodiment of the present invention, after the authentication code is transmitted to the MO server 400 through the communication module 110, the processor 160 controls to transmit a "check signal" request to the service server 500 through the communication module 110 to determine whether the authentication code is stored in the service server 500 that has received the authentication code and the telephone number information of the electronic device.

The processor 160 controls to transmit the "check signal" request to the service server 500 in a short period within N seconds such as 1 or 2 seconds from the transmission of the authentication code, and in a constant period such as 10 or 15 minutes after a predetermined period of time such as 10 or 15 seconds from the transmission of the authentication code.

For example, the processor 160 controls to transmit the corresponding "check signal" request for a predetermined time such as 1 or 2 hours. According to an embodiment of the present invention, the communication module 110 receives from the service server 500 a notification signal stating that the authentication code is not stored in the service server 500. If the processor 160 receives the notification signal stating that the authentication code is not stored in the service server 500, or if no response to the check signal is received from the service server 500 within a predetermined time, the processor 160 retransmits the authentication code through the communication module 110, or converts the authentication processing server such that the authentication is to be processed using the MT server 300.

According to an embodiment of the present invention, the service server 500 conducts a service registration process to thereby store the information such as the IMEI, IMSI, or MAC address of the electronic device 100, and creates the authentication token and an ID of the electronic device 100 to thereby transmit the same to the electronic device 100.

According to an embodiment of the present invention, the processor 160 controls to receive the authentication token, which includes the authority to access the service provided by the service server 500, from the service server 500 that has received the authentication code and the telephone number information of the electronic device 100 from the MO server 400 through the communication module 110. The processor 160 controls to store the received authentication token in the storage module 130. The authentication token includes the ID information of the electronic device 100. The token management module 165 manages the received authentication token.

According to an embodiment of the present invention, the processor 160 receives a push token from the push server 600 through the communication module 110, and controls to store the received push token in the storage module 130. The token management module 165 manages the received push token.

According to an embodiment of the present invention, if the server determining module 161 determines that the MO server 400 is not available, the server determining module 161 uses the MT server or the ACS.

According to an embodiment of the present invention, when using the MT server 300, the processor 160 controls to display a GUI including an input field for the telephone number through the display module 140. The processor 160 determines whether a mobile subscriber integrated services digital network-number (MSISDN) information is stored in the SIM card that is mounted on the electronic device 100.

The MSISDN identifies a subscriber in mobile networks, such as global System for mobile communication (GSM) or a universal mobile telecommunications system (UMTS).

According to an embodiment of the present invention, if it is determined that the MSISDN information is stored in the SIM card, the processor 160 identifies the telephone number information of the electronic device based on the MSISDN information.

According to an embodiment of the present invention, the processor 180 can control to automatically input the identified telephone number information into the telephone number input field, and transmit the authentication code request signal to the MT server 300 through the communication module 110.

According to an embodiment of the present invention, the processor 160 compares the cache table including at least one of electronic device-using-country information, network communication provider information of the electronic device 100, or location information of the electronic device 100, which is stored in the storage module 130, with the MSIDSN information. Based on the result of the comparison, the processor controls to transmit a signal for requesting the authentication code to the MT server 300 through the communication module 110. If the information stored in the cache table is identical to the MSIDSN information, the processor 160 controls to automatically fill in the telephone number input field without a separate user input, and transmit an authentication code request signal to the MT server 300.

According to an embodiment of the present invention, if the MSIDSN information is not stored in the storage module 130, the processor 160 receives a user input for the telephone number.

According to an embodiment of the present invention, the processor 160 can receive the authentication code in response to the authentication code request signal using an SMS from the MT server 300 through the communication module. The processor 160 automatically parses the received SMS to thereby automatically fill in an authentication code field without a separate input for the authentication code, and controls to automatically fill in the authentication code field and perform the authentication process.

According to an embodiment, if the transmission/reception of the authentication code is delayed, the processor 160 controls the display module 140 to display a GUI related to the delay of the authentication code. If the transmission/reception of the authentication code is delayed, the processor 160 controls to switch into an automatic call system in which to perform the authentication process.

According to an embodiment of the present invention, the processor 160 controls to perform the authentication function corresponding to the input signal for requesting the authentication, based on the received authentication code.

According to an embodiment of the present invention, a "check signal" request to determine whether the electronic device continues to use the service is received from the service server 500 through the communication module 110 after the service registration. The processor 160 controls to transmit a response signal to the received "check signal" request through the communication module 110.

According to an embodiment of the present invention, the processor 160 receives the authentication request input signal, and determines a server to perform the communication with the electronic device based on at least one of the IMSI or the network IP information of the electronic device. According to an embodiment, the processor 160 controls the communication module to perform the communication with the determined server.

Figure 4:
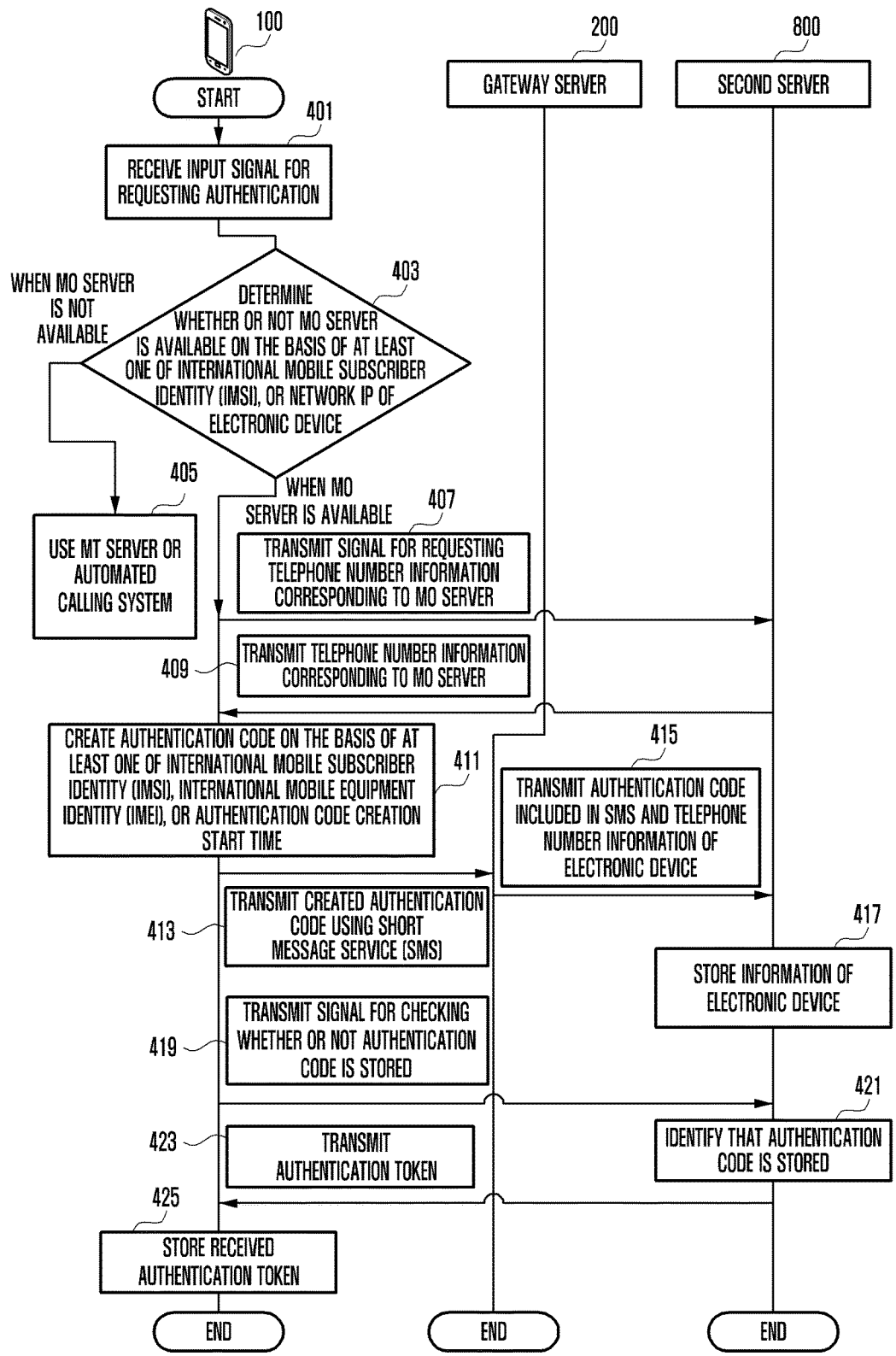
FIG. 4 illustrates an authentication process of an electronic device, a gateway server, and the second server, according to various embodiments of the present invention.

FIG. 4 illustrates the authentication process of the electronic device 100, the gateway server 200, and the second server 800, according to various embodiments of the present invention.

In step 401, the electronic device 100 receives an input signal for requesting an authentication with respect to the service provided by the second server 800, or a signal created by a touch input event detected by the electronic device 100. The second server 800 can include the MT server 300, the MO server 400, the service server 500, and the push server 600.

In step 403, the electronic device 100 determines whether the MO server 400 is available based on at least one of the IMSI, or the network Internet protocol (IP) of the electronic device 100. The electronic device 100 determines the availability of the MO server 400 based on the information stored in the SIM card mounted on the electronic device 100, or the configuration state of the electronic device 100, such as the configuration to use or not to use the MO server 400. For example, the electronic device 100 determines the availability of the MO server 400 by using the predetermined MO server-related information, or by receiving the MO server-related information from the second server 800.

If it is determined that the MO server 400 is not available, the electronic device 100 uses the MT server 300 or the ACS in step 405.

If it is determined that the MO server 400 is available, the electronic device 100 transmits, to the second server 800, a signal for requesting the telephone number information corresponding to the MO server 400 in step 407. The second server 800 transmits the telephone number information corresponding to the MO server 400 to the electronic device 100 in step 409.

The electronic device 100 creates the authentication code based on at least one of the IMSI, the IMEI, or the authentication code creation start time in step 411. The electronic device 100 creates the authentication code in the form of a hash code through a predetermined encryption method, such as SHA-1, or SHA-2.

In step 413, the electronic device 100 transmits the created authentication code to the gateway server 200 using an SMS. In step 415, the gateway server 200 transmits the authentication code included in the received SMS and the telephone number information of the electronic device 100 to the second server 800. In step 417, the second server 800 stores the information of the electronic device 100.

In step 419, the electronic device 100 transmits a signal to determine whether the authentication code is stored to the second server 800. The second server 800 determines whether the authentication code is stored therein in step 421. If the authentication code is not stored, the second server 800 determines the existence of the authentication code in a predetermined period such as 1 or 2 seconds within a predetermined period of time such as 5 or 10 seconds from the reception of the authentication code check signal. The second server 800 may also determine the existence of the authentication code in a long period such as 15 or 20 minutes after a predetermined critical time such as 1 or 2 hours.

If it is determined that the authentication code is not stored in the second server 800, the second server 800 transmits, to the electronic device 100, a notification signal stating that the authentication has failed. According to an embodiment, if it is determined that the authentication code is not stored in the second server 800, the second server 800 transmits, to the electronic device 100, a signal to request of the electronic device 100 to resend the authentication code using the MO server 400, or switches into the authentication processing method using the MT server 300.

If it is determined that the authentication code is stored in the database in step 421, the second server 800 transmits the authentication token to the electronic device 100 in step 423. The electronic device 100 stores the received authentication token in step 425.

Figure 5:
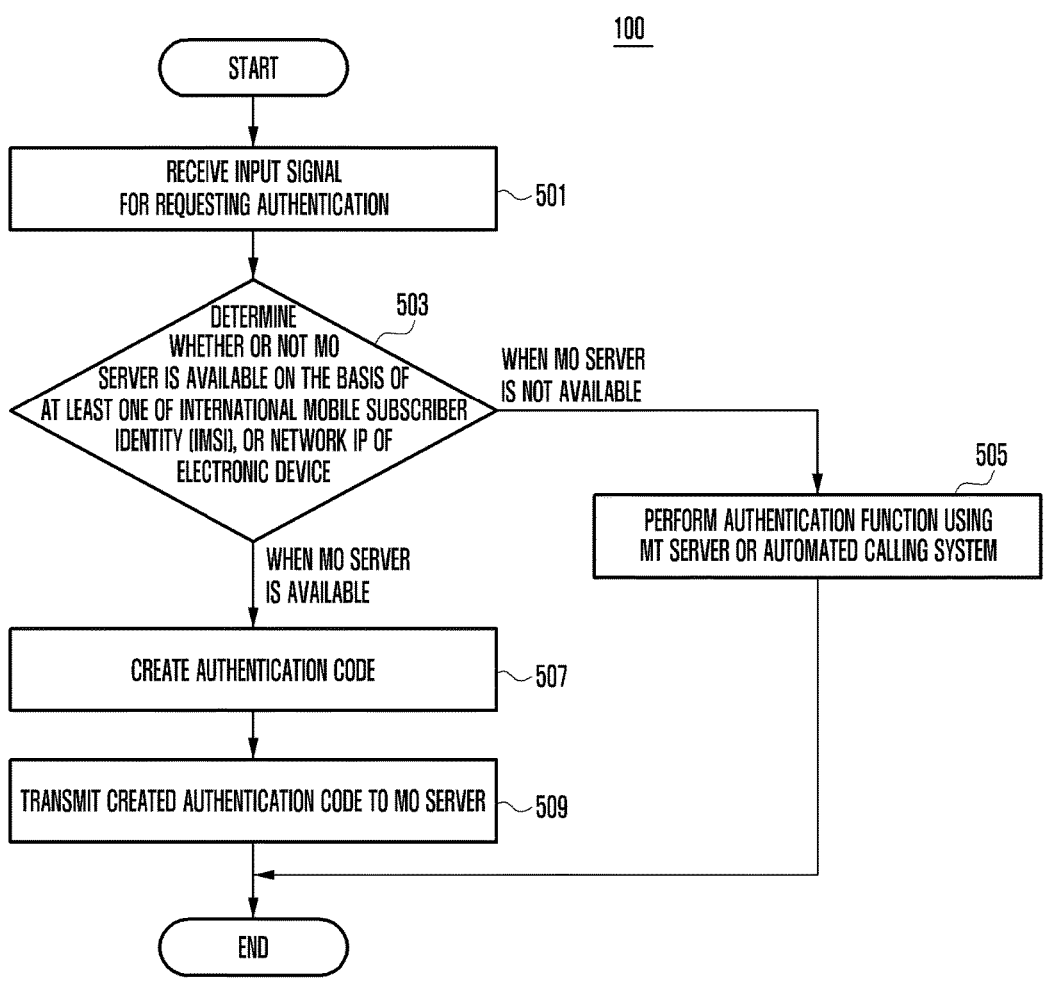
FIG. 5 illustrates an authentication process of an electronic device, according to various embodiments of the present invention.

FIG. 5 illustrates the authentication process of the electronic device 100, according to various embodiments of the present invention.

In step 501, the electronic device 100 receives an input signal for requesting an authentication in order to perform the service provided by the server, or a signal created by detecting an input event in a separate user interface. For example, when the electronic device 100 detects an input event to agree with terms in the user interface, the electronic device 100 determines that the authentication request input signal has been received.

In step 503, the electronic device 100 determines whether the MO server 400 is available based on at least one of an IMSI, or a network IP of the electronic device. The electronic device 100 determines the availability of the MO server 400 based on the information stored in the SIM card mounted on the electronic device 100, or the configuration state of the electronic device 100, such as the configuration to use or not to use the MO server 400. For example, many countries provide different communication standards and connectable servers to a user of an electronic device 100. The electronic device 100 can determine the availability of the MO server 400 by identifying whether the MO server 400 exists in a nation or is supported in the nation.

If it is determined that the MO server 400 is not available, the electronic device 100 performs the authentication process by using the MT server 300 or the ACS in step 505.

If it is determined that the MO server 400 is available, the electronic device 100 creates the authentication code in step 507. According to an embodiment, the authentication code is created based on the IMSI, the IMEI, or the authentication code creation start time of the electronic device 100. The created authentication code is encrypted in the form of a hash code. The electronic device 100 transmits the created authentication code to the MO server 400 in step 509. According to an embodiment, the MO server 400 transmits the authentication code and the telephone number information of the electronic device 100 to the service server 500. According to an embodiment, the electronic device 100 receives the authentication token including the authority to use the service from the service server 500.

Figure 6:
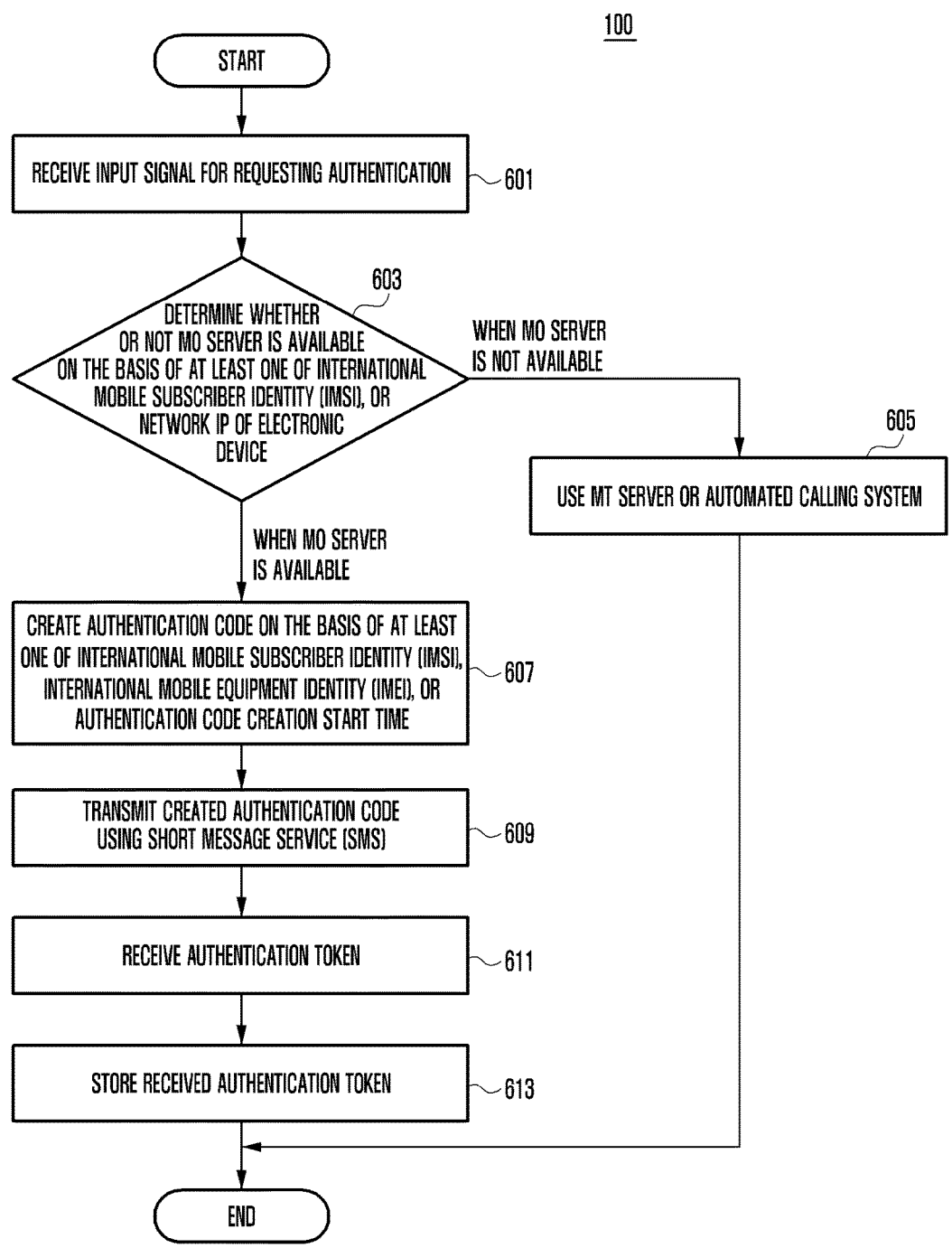
FIG. 6 illustrates an authentication process of an electronic device, according to various embodiments of the present invention.

FIG. 6 illustrates the authentication process of the electronic device 100, according to various embodiments of the present invention.

In step 601, the electronic device 100 receives an input signal for requesting an authentication in order to perform the service provided by the server, or a signal created by detecting an input event in a separate user interface. For example, when the electronic device 100 detects an input event to agree with terms, clauses, or provisions in the user interface, the electronic device 100 determines that the authentication request input signal has been received.

In step 603, the electronic device 100 determines whether the MO server 400 is available based on at least one of the IMSI, or the network IP of the electronic device. The electronic device 100 determines the availability of the MO server 400 based on the information stored in the SIM card mounted on the electronic device 100, or the configuration state of the electronic device 100.

If it is determined that the MO server 400 is not available, the electronic device 100 performs the authentication process by using the MT server 300 or the ACS in step 605.

In step 607, if it is determined that the MO server 400 is available, the electronic device 100 creates the authentication code based on the IMSI, the IMEI, or the authentication code creation start time of the electronic device 100. The created authentication code is encrypted in the form of a hash code.

The electronic device 100 transmits the created authentication code to the MO server 400 using an SMS in step 609. According to an embodiment, the MO server 400 transmits the authentication code and the telephone number information of the electronic device 100 to the service server 500.

The electronic device 100 receives the authentication token including the authority to use the services from the service server 500 in step 611. The electronic device 100 stores the received authentication token in step 613.

Figure 7:
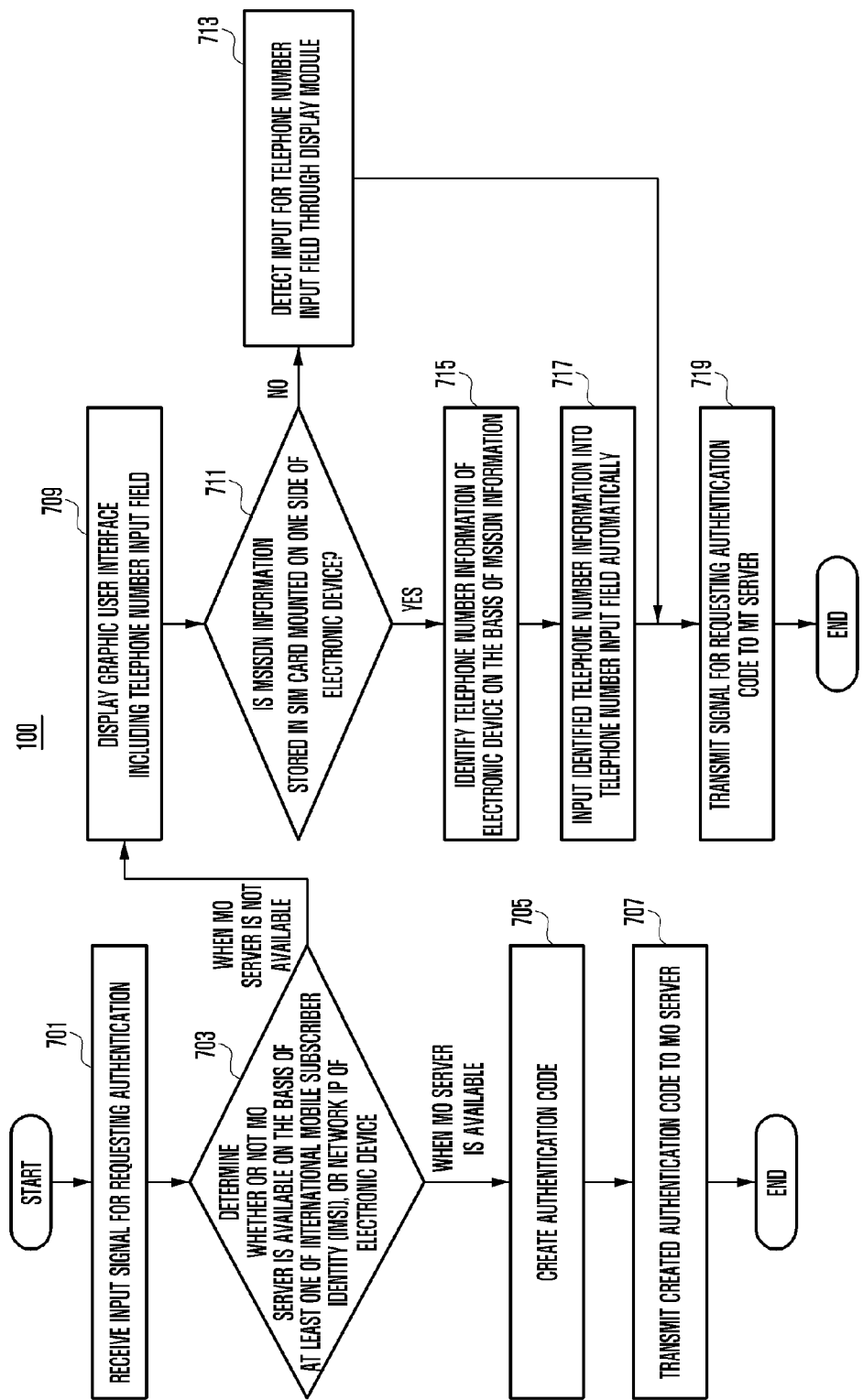
FIG. 7 illustrates an authentication process of an electronic device, according to various embodiments of the present invention.

FIG. 7 illustrates the authentication process of the electronic device 100, according to various embodiments of the present invention.

In step 701, the electronic device 100 receives an input signal for requesting an authentication in order to perform the service provided by the server, or a signal created by detecting an input event in a separate user interface. For example, when the electronic device 100 detects an input event to agree with terms in the user interface, the electronic device 100 determines that the authentication request input signal has been received.

In step 703, the electronic device 100 determines whether the MO server 400 is available based on at least one of the IMSI or the network IP of the electronic device. The electronic device 100 determines the availability of the MO server 400 based on the information stored in the SIM card mounted on the electronic device 100, or the configuration state of the electronic device 100.

In step 705, if it is determined that the MO server 400 is available, the electronic device 100 creates the authentication code based on the IMSI, the IMEI, or the authentication code creation start time of the electronic device 100. The created authentication code is encrypted in the form of a hash code. The electronic device 100 transmits the created authentication code to the MO server 400 in step 707. According to an embodiment, the MO server 400 transmits the authentication code and the telephone number information of the electronic device 100 to the service server 500, and the electronic device 100 receives the authentication token including the authority to use the service from the service server 500.

If it is determined that the MO server 400 is not available, the electronic device 100 displays a GUI including a telephone number input field in step 709. In step 711, the electronic device 100 determines whether the MSISDN information is stored in the SIM card mounted on the electronic device 100. If it is determined that the MSISDN information is not stored in the SIM card, the electronic device 100 detects an input for the telephone number input field through the display module 140 in step 713.

If it is determined that the MSISDN information is stored in the SIM card, the electronic device 100 identifies the telephone number information of the electronic device 100 based on the MSISDN information in step 715. The electronic device 100 automatically inputs the identified telephone number information into the telephone number input field in step 717. The electronic device 100 transmits a signal for requesting the authentication code to the MT server 300 in step 719.

A host device such as the service server 500, the first server 700, the second server 800, or the third server 900, includes an authentication management module that receives a signal for requesting telephone number information corresponding to the MO server 400 from the electronic device 100, transmits the telephone number information corresponding to the MO server 400 to the electronic device 100, receives the authentication code and the telephone number information of the electronic device 100, stores the information of the electronic device 100, and transmits the authentication token to the electronic device 100.

The above described components of the electronic device according to various embodiments of the present invention may be formed of one or more components, and a name of a corresponding component element may be changed based on the type of electronic device. The electronic device according to the present invention may include one or more of the aforementioned components or may further include other additional components, or some of the aforementioned components may be omitted. Further, some of the components of the electronic device according to the various embodiments of the present invention may be combined to form a single entity, and thus, may equivalently execute functions of the corresponding elements prior to the combination.

The term "module" used in various embodiments of the present invention may refer to, for example, a "unit" including one of hardware, software, and firmware, or a combination of two or more of the hardware, software, and firmware. The "module" may be interchangeable with a term, such as a unit, a logic, a logical block, a component, or a circuit. The module may be a minimum unit of an integrated component element or a part thereof. The "module" may be the smallest unit that performs one or more functions or a part thereof. The module may be mechanically or electronically implemented. For example, the "module" according to various embodiments of the present invention may include at least one of an application-specific integrated circuit (ASIC) chip, a field-programmable gate arrays (FPGAs), and a programmable-logic device for performing operations which have been known or are to be developed hereafter.

According to various embodiments, at least a part of a device or a method according to the various embodiments of the present invention may be embodied by, for example, a command stored in a computer readable storage medium in a form of a programming module. When the instruction is performed by at least one processor, the at least one processor may perform a function corresponding to the instruction. The computer-readable storage medium may, for example, be the storage module 130. At least some of the programming modules may be implemented by, for example, the processor 160. At least a part of the programming module may, for example, include a module, a program, a routine, a set of instructions, or a process for performing at least one function.

A computer-readable recording medium, according to an embodiment of the present invention, may store a program that includes an instruction by which the display module 140 receives an input signal for requesting the authentication, an instruction by which the processor 160 determines whether the mobile oriented (MO) server 400 is available based on at least one of an IMSI or network IP information of the electronic device 100, an instruction by which, if it is determined that the MO server 400 is available, the processor 160 creates an authentication code, and an instruction by which the processor controls the communication module 110 to transmit the created authentication code to the MO server 400.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present invention, and vice versa.

A module or a programming module according to the present invention may include at least one of the above-described component elements, a few of the component elements may be omitted, or additional component elements may be included. Operations executed by a module, a programming module, or other component elements according to various embodiments of the present invention may be executed sequentially, in parallel, repeatedly, or in a heuristic manner. Some operations may be executed according to another order or may be omitted, or other operations may be added.

While the present invention has been shown and described with reference to certain embodiments thereof, it will be understood by those skilled in the art that various changes in form and details may be made therein without departing from the scope of the present invention. Therefore, the scope of the present invention should not be defined as being limited to the embodiments, but should be defined by the appended claims and equivalents thereof.

What is claimed is:

1. An electronic device comprising:
    a processor configured to receive an input signal for requesting an authentication, determine whether a mobile oriented (MO) server is available based on at least one of an international mobile subscriber identity (IMSI) and network Internet protocol information of the electronic device, and if it is determined that the MO server is available, create an authentication code; and
    a communication transceiver configured to transmit the created authentication code to the MO server and receive, from a service server that has received the authentication code and telephone number information of the electronic device from the MO server, an authentication token that includes authority to access a service provided by the service server.

2. The electronic device of claim 1, wherein after transmitting the authentication code to the MO server, the communication transceiver is further configured to transmit a check signal request to the service server, to determine whether the authentication code is stored in the service server that has received the authentication code and telephone number information of the electronic device from the MO server.

3. The electronic device of claim 1, wherein the processor is further configured to create the authentication code based on at least one of the IMSI and an international mobile equipment identity of the electronic device, or a creation start time of the authentication code, or as a hash code through a predetermined encryption method.

4. The electronic device of claim 3, wherein the processor is further configured to identify telephone number information corresponding to the MO server, and to control the communication transceiver to transmit the created authentication code to the MO server using a short message service.

5. The electronic device of claim 1, wherein the processor is further configured to determine whether the MO server is available based on at least one of MO server-related data stored in a memory, or MO server-related data received from an external server.

6. The electronic device of claim 1, wherein if it is determined that the MO server is not available, the processor is further configured to use a mobile terminated (MT) server or an automated calling system to create the authentication code.

7. The electronic device of claim 6, wherein when using the MT server, the processor is further configured to control a display to display a graphical user interface including a telephone number input field, identify, the telephone number information of the electronic device based on mobile subscriber integrated services digital network-number (MSISDN) information stored in a subscriber identity module card mounted on the electronic device, automatically input the identified telephone number information into the telephone number input field, and control the communication transceiver to transmit the signal for requesting the authentication code to the MT server.

8. The electronic device of claim 7, wherein the processor is further configured to compare a cache table that includes at least one of electronic device-using-country information, network communication provider information of the electronic device, and location information of the electronic device, which is stored in the memory, with the MSIDSN information, and, based on a result of the comparison, control the communication transceiver to transmit the signal for requesting the authentication code to the MT server.

9. The electronic device of claim 7, wherein the communication transceiver is further configured to receive, from the MT server, the authentication code in response to the signal for requesting the authentication code using a short message service, and the processor is further configured to control to perform an authentication function corresponding to the input signal for requesting the authentication code based on the received authentication code.

10. A method for processing an authentication in an electronic device, the method comprising:
    receiving, by a processor, an input signal for requesting the authentication;
    determining, by the processor, whether a mobile oriented (MO) server is available based on at least one of an international mobile subscriber identity (IMSI) and network Internet protocol information of the electronic device;
    if it is determined that the MO server is available, creating, by the processor, an authentication code;
    controlling, by the processor, a communication transceiver to transmit the created authentication code to the MO server; and
    receiving, by the communication transceiver, from a service server that has received the authentication code and telephone number information of the electronic device from the MO server, an authentication token that includes authority to access a service provided by the service server.

11. The method of claim 10, further comprising transmitting, by the communication transceiver, after transmitting the authentication code to the MO server, a check signal request to the service server to determine whether the authentication code is stored in the service server that has received the authentication code and telephone number information of the electronic device from the MO server.

12. The method of claim 10, wherein creating the authentication code comprises at least one of:
creating, by the processor, the authentication code based on at least one of the IMSI and an international mobile equipment identity (IMEI) of the electronic device, or a creation start time of the authentication code; and
creating, by the processor, the authentication code as a hash code through a predetermined encryption method.

13. The method of claim 12, wherein transmitting the created authentication code to the MO server comprises:
identifying, by the processor, telephone number information corresponding to the MO server; and
transmitting, by the communication transceiver, the created authentication code to the MO server using a short message service.

14. The method of claim 10, wherein the processor is controlled to determine whether the MO server is available based on at least one of MO server-related data stored in a memory, and MO server-related data received from an external server.

15. The method of claim 10, further comprising, if the MO server is not available, using, by the processor, a mobile terminated (MT) server or an automated calling system (ACS).

16. The method of claim 15, further comprising:
controlling, by the processor, if using the MT server, a display to display a graphical user interface (GUI) including a telephone number input field;
identifying, by the processor, telephone number information of the electronic device based on mobile subscriber integrated services digital network-number (MSISDN) information stored in a subscriber identity module card mounted on the electronic device;
automatically inputting, by the processor, the identified telephone number information into the telephone number input field; and
transmitting, by the communication transceiver, a signal for requesting the authentication code to the MT server.

17. The method of claim 16, wherein identifying the telephone number information of the electronic device based on the MSISDN information comprises:
comparing, by the processor, with the MSIDSN information, a cache table stored in the memory that includes at least one of country of use information of the electronic device, network communication provider information of the electronic device, and location information of the electronic device; and
identifying, by the processor, based on a result of the comparison, the telephone number information of the electronic device.

18. The method of claim 16, further comprising:
receiving, by the communication transceiver, from the MT server, the authentication code in response to the signal for requesting the authentication code using a short message service (SMS); and
performing, by the processor, an authentication function corresponding to the input signal for requesting the authentication code based on the received authentication code.

* * * * *